United States Patent
Eger

(10) Patent No.: US 10,726,537 B2
(45) Date of Patent: Jul. 28, 2020

(54) IMAGE ACQUISITION FOR MEAT GRADING

(71) Applicant: Horst Eger, Ahrensfelde (DE)

(72) Inventor: Horst Eger, Ahrensfelde (DE)

(*) Notice: Subject to any disclaimer, the term of this patent is extended or adjusted under 35 U.S.C. 154(b) by 137 days.

(21) Appl. No.: 16/115,926

(22) Filed: Aug. 29, 2018

(65) Prior Publication Data

US 2020/0074613 A1    Mar. 5, 2020

(51) Int. Cl.
| | |
|---|---|
| *G06K 9/00* | (2006.01) |
| *G06T 7/00* | (2017.01) |
| *G06T 7/521* | (2017.01) |
| *A22C 17/00* | (2006.01) |

(52) U.S. Cl.
CPC ........ *G06T 7/0004* (2013.01); *A22C 17/0033* (2013.01); *G06T 7/521* (2017.01); *G06T 2207/10012* (2013.01); *G06T 2207/30128* (2013.01)

(58) Field of Classification Search
None
See application file for complete search history.

(56) References Cited

U.S. PATENT DOCUMENTS

| | | | | |
|---|---|---|---|---|
| 5,944,598 | A * | 8/1999 | Tong | A22B 5/007 382/100 |
| 6,351,573 | B1 * | 2/2002 | Schneider | G06F 19/321 382/128 |
| 6,751,364 | B2 | 6/2004 | Haagensen et al. | |
| 6,891,961 | B2 | 5/2005 | Eger et al. | |
| 7,850,512 | B2 * | 12/2010 | Eger | A22B 5/0035 452/156 |
| 9,675,091 | B1 | 6/2017 | Eger | |
| 2003/0072472 | A1 | 4/2003 | Haagensen et al. | |
| 2004/0023612 | A1 * | 2/2004 | Kriesel | A01K 29/00 452/157 |
| 2005/0257748 | A1 * | 11/2005 | Kriesel | A01K 11/008 119/51.02 |
| 2007/0258625 | A1 * | 11/2007 | Mirtsching | A22B 5/007 382/110 |
| 2014/0088939 | A1 * | 3/2014 | Garant | G06Q 50/02 703/2 |
| 2020/0077667 | A1 * | 3/2020 | Lauridsen | A22B 5/007 |

FOREIGN PATENT DOCUMENTS

| | | | |
|---|---|---|---|
| DE | 44086041 | A1 | 12/1995 |
| DE | 10050836 | A1 | 6/2002 |

* cited by examiner

*Primary Examiner* — Shervin K Nakhjavan
(74) *Attorney, Agent, or Firm* — Kriegsman & Kriegsman

(57) ABSTRACT

Image acquisition for meat grading. In one embodiment, a method includes aligning a suspended slaughtered animal half according to a predetermined orientation and retaining this orientation by a positioning device designed as part of a processing line until image acquisition of a cut surface; executing a 3D measurement and setting a trigger point in a control device, wherein the position of the cut surface is determined by an image processing device from a three-dimensional image recorded by a first image acquisition device; aligning the optical components of a second image acquisition device in accordance with the position in space determined for the cut surface; and trigger-initiated execution of at least one two-dimensional image acquisition of the cut surface by the second image acquisition device, the optical components of which are aligned beforehand, when a trigger condition coupled to the trigger point is met, as identified by the above control device.

21 Claims, 2 Drawing Sheets

IMAGE ACQUISITION FOR MEAT GRADING

The invention relates to a solution for the image acquisition of carcasses of slaughtered animals, more precisely of halves of the carcasses of slaughtered animals, for the purpose of meat grading. Subjects of the invention are a corresponding method and a system suitable for carrying out the method. In this case, the actual meat grading by a computer-assisted analysis of the acquired image or images of a respective half of a slaughtered animal is not the focus of the invention. The core of the invention is rather the way in which images, preferably digital images, are acquired, in order to obtain images that, in the subsequent processing thereof by means of a hardware- and software-based image processing device designed for this purpose, lead to results that enable statements that are as precise as possible to be made about the meat texture, the meat quality, or the meat yield.

Corresponding evaluation methods, by means of which results of the aforementioned kind can be obtained by differentiation between light and dark image regions or by color differentiation between the image regions, for example, can also be included explicitly herewith in the following presentation relating to the invention through reference to the publications DE 44 08 604 A1, DE 100 50 836 A1, and U.S. Pat. No. 9,675,091 B1 in regard to the disclosed content thereof. A preferred case of application of the technical solution presented is the grading of a rib eye in the carcasses of slaughtered cattle in regard to the marbling and meat yield thereof, for example. Therefore, the following explanations relate mostly to this preferred proposed use, but without the invention being limited to it.

BACKGROUND OF THE INVENTION

Of great importance for the meat processing industry in its modern form is to undertake a grading of meat in regard to the quality thereof and in regard to the yield to be expected for specific products already in the processing lines of slaughtering operations. For this purpose, for example, at defined sites or regions in the carcasses of slaughtered animals, also referred to as animal carcasses, or the halves thereof, which, suspended from a tube track, are usually passed through a processing line, it is known to make a cut that does not completely sever the carcass and to inspect at least one of the cut surfaces thereby obtained or, in individual cases, to even inspect both of the cut surfaces.

Originally, the assessment of corresponding cut surfaces occurred as part of the visual inspection by personnel trained for this purpose. An approach of this kind has become known, for example, in connection with the grading of the rib eye in the carcasses of slaughtered cattle. In this case, a person undertaking the grading assesses a cut surface produced beforehand by making a cut between the 12th rib and the 13th rib of a side of beef of a slaughtered animal, in particular in regard to the marbling and the size of the rib eye. However, the result of such a grading occurring by a human is naturally more or less subjective in nature.

In order to obtain more objective and insofar more precise results as well as for reasons of processing economy, a transition has been made to undertaking the meat grading by way of a software-based processing of images that are acquired from a carcass of a slaughtered animal, or parts thereof, or of cut surfaces of the aforementioned kind by means of electronic image acquisition systems. By means of image processing devices equipped with corresponding software for this purpose, it is hereby possible, on account of the different lightness and/or the different colors of individual image regions, to draw a conclusion about the distribution of the tissue-compartmented bones, meat, and fat as well as, by the use of rules deposited in the system for this purpose, to undertake classifications of the meat in regard to its quality and the yields to be expected for individual meat products.

A method of this kind is described, for example, by US 2003/0072472 A1, in particular in regard to the grading of the rib eye in the case of beef. The solution described in said publication hereby also proceeds from a cut made in the region between the 12th rib and the 13th rib in the side of beef of a slaughtered animal. Fed through the processing line suspended at one of the extremities thereof, the carcass gapes open in the cut region, so that, in any case, at least one of the two cut surfaces resulting from the cut can be recorded with imaging technology by means of at least one camera. The recorded image or images of the cut surface are then fed to a corresponding image processing device for processing with the aim of evaluating the meat.

In accordance with the solution described in the cited publication, the image acquisition occurs by means of an optical measurement head or sensor head that is guided by hand. The sensor head is wedge-shaped in design and can therefore be introduced easily into the gaping region of the cut made in the carcass. Through a camera or a comparable optical sensor unit contained in the measurement head or sensor head, images of the cut surface to be evaluated are recorded at the angle dictated by, among other things, the geometry of the measurement head or sensor head.

Fundamentally, by means of the previously described system, relatively good grading results are obtained. A certain source of error and accordingly a weak point, however, is represented by the not insubstantial variation in the manual positioning of the measurement head or sensor head. In consequence thereof and in spite of fitting assisting auxiliary devices onto the measuring head, distortions in the image acquisition occur and hence errors in the meat grading result, which are undesired on account of the existing strong cost pressure in the meat processing industry. In order to be able to meet even better the interest of the meat processing industry in a precise meat grading, therefore, there is required a solution that minimizes the variance in the image acquisition of carcasses of slaughtered animals and hence makes it possible to provide, as a basis for the subsequent electronic processing, images of a constantly high quality.

DESCRIPTION OF THE INVENTION

In accordance with the proposed method for image acquisition, at least one subregion of a cut surface produced beforehand at the slaughtered animal half is imaged by means of an image acquisition device, which is designed for this purpose, on slaughtered animal halves suspended along a tube track and moving through a processing line. By means of the mentioned image acquisition device, one image or a plurality of images of the related cut surface or of the subregion thereof are recorded and transmitted to an electronic image processing device for the purpose of meat grading, whereby said electronic image processing device analyzes the image or images by means of a software run on it. By use of known methods, it is hereby possible to make statements in regard to the meat quality, such as statements in regard to the ratio of meat and fat or in regard to marbling, as well as statements in regard to meat yield relating to specific, individually handled parts of the carcass of the slaughtered animal.

Statements in regard to meat quality or in regard to yield are obtained by means of the image processing device through a differentiation between the tissue compartments meat, fat, and bones on the basis of an analysis of differences in lightness or of differences in color or else of differences in lightness and differences in color occurring in the at least one image of the cut surface. However, as already stated in the introduction, the analyses of the acquired images and the actual meat grading occurring in the course thereof do not constitute the core of the invention. The core of the invention instead consists in acquiring the images that are to be employed for the meat grading in a largely automated process and in hereby ensuring that the images fed to the processing have a reproducibly high quality. The method comprises, in addition, the following key steps:

First of all, the slaughtered animal half, suspended at the tube track, is aligned in accordance with a predetermined orientation, wherein this orientation is maintained by means of a positioning device formed as a part of the processing line until the conclusion of the image acquisition of the cut surface or the subregions thereof to be evaluated.

A 3D measurement occurs at a slaughtered animal half aligned in such a way, wherein, by means of a first image acquisition device, three-dimensional images of at least one section of the slaughtered animal half, which definitely includes the cut surface to be evaluated, are recorded. It is insofar also possible for a three-dimensional acquisition of the entire slaughtered animal half to occur. From the three-dimensional image recorded by means of the first image acquisition device, the image processing device then determines the position in space of the cut surface that is to undergo image acquisition for the meat grading, wherein a trigger point is set in a control device once the position of the cut surface is determined.

After the position of the cut surface is determined, optical components of a second image acquisition device serving for the actual image acquisition of the cut surface or of a subregion thereof are aligned in accordance with this position. Said optical components involve, in particular, at least one optical sensor—for example, in the form of a camera—and means for illuminating the respective cut surface that is to undergo image acquisition as well as, if need be, one laser light source or a plurality of laser light sources that is or are used beyond this (for example, for utilization of the light section method).

Finally, the at least two-dimensional image acquisition of the cut surface or the subregion thereof, which constitutes the basis of the meat grading, occurs by means of the aforementioned second image acquisition device, wherein the operation of image acquisition of the cut surface is started when a trigger condition that is coupled to the set trigger point is met and is identified by the already mentioned control device.

The sequence of the proposed method will be explained in accordance with a fundamental embodiment by using the preceding statements. Some statements are still to be made later in regard to individual aspects, such as, for example, in regard to the question of the alignment of the slaughtered animal half and the orientation thereof during the image acquisition of the cut surface employed for the meat grading or in regard to the question of the establishment of the hereby discussed trigger point and of the trigger condition, the occurrence of which starts the image acquisition.

In accordance with the preferred intended use, the proposed method serves in accordance with an intended embodiment for image acquisition for the purpose of evaluating the rib eye of a side of beef of a slaughtered animal. By means of the method, image acquisition is carried out on a cut surface of a side of beef of a slaughtered animal that is moving along the already discussed tube track through the processing line, said cut surface having been produced beforehand by making a cut between the 12th rib and the 13th rib in the slaughtered animal half. In relation to the side of beef of a slaughtered animal suspended from the tube track, this cut runs in the horizontal direction, with the slaughtered animal half not being completely severed. In a special embodiment of the invention, the sequence of the process is designed as follows for the purpose of image acquisition of the rib eye:

The suspended side of beef of a slaughtered animal furnished with the gaping cut is aligned in accordance with a predetermined orientation and, while retaining this alignment, is thus maintained, until the conclusion of the image acquisition of the cut surface containing the rib eye, by means of a positioning device that is formed as a part of the processing line. The alignment of the slaughtered animal half, that is, the alignment of the slaughtered animal halves, a plurality of which, if appropriate, are moved in succession through the processing line and are each evaluated, can occur—as was also the case in the previously illustrated embodiment of the invention—in two phases. In a first phase, a coarse alignment hereby occurs, with the corresponding orientation of the slaughtered animal halves then being maintained in terms of a fine positioning by means of the positioning device until the conclusion of the image acquisition of the cut surface that is to be evaluated. Depending on the implementation of the method and the characteristics of the system used for its implementation, the coarse alignment can occur manually by the personnel operating and monitoring the processing line or else autonomously by a system designed for this purpose and designed for carrying out the method.

By way of a 3D measurement in conjunction with setting a trigger point in a control unit, the position in space of the cut surface containing the rib eye is determined. This occurs by use of a first image acquisition device, whose recorded three-dimensional image of the side of beef of a slaughtered animal or of a region of this side of beef of a slaughtered animal that contains the cut surface is processed by the image processing device for determination of the position and orientation of the cut surface.

After the position of the cut surface containing the rib eye has been established, the optical components of a second image acquisition device, which serves for the actual image acquisition of the rib eye, are aligned by the control device in accordance with the position of the cut surface comprising the rib eye in accordance with the data determined by the image processing device.

Under trigger control, namely, when a trigger condition coupled to the set trigger point is identified by the mentioned control device as having been met, at least one two-dimensional acquisition of the cut surface containing the rib eye is then started by means of the second image acquisition device. The image or images hereby recorded constitute the basis for the meat grading through a processing by means of the image processing device.

Methods for determining the position of a surface in space and accordingly also for the previously described determination of the position in space of the cut surface employed for the meat grading are also already fundamentally known as such. For this purpose, it is possible for a 3D measurement that utilizes the principle of grayscale values to occur, with lighter grayscale values of an as such two-dimensional image indicating a greater nearness and darker grayscale values indicating a greater distance of the optically measuring device to the measured object and accordingly leading to a virtual 3D image with the coordinates X, Y, Z, in which, for example, the Z coordinate represents, on the basis of the gray value scale, the distance between arbitrary points of an X-Y plane of the measured object and the optical measuring device.

To this end, in regard to the just illustrated embodiment of the method for a grading of the rib eye—for example, in the case in which the bottom cut surface is taken—a correspondingly formed 3D measurement device (first image acquisition device) is arranged and aligned (positioned) in a stationary manner in such a way that the edge between the bottom cut surface containing the rib eye and the plane of cleavage of the carcass of the slaughtered animal, from which the respective slaughtered animal half originated, is locally nearest to the measurement device. Accordingly, this edge and thus an approximated line through the resulting local minimum Z coordinate in space are determined. Above this edge and with increasing depth of the Z coordinate, the position of the bottom cut surface itself in X-Y-Z space is hereby obtained. Accordingly, in combination with a 2D image, it is possible to determine each point on the cut surface also in terms of its depth.

As discussed, the cut surface employed for the meat grading in each case undergoes image acquisition at least two-dimensionally both in accordance with the fundamental method principle initially described in regard to the sequence of the method and in accordance with the design of the method relating to the grading of the rib eye by means of the second image acquisition device. In further development of the method, however, it can also be provided that the cut surface undergoes three-dimensional image acquisition again directly after its two-dimensional image acquisition. The data obtained in the subsequent three-dimensional image acquisition are utilized in accordance with this embodiment of the method to make corrections in the results obtained for the meat grading by means of the previously created two-dimensional image or images in order to possibly take into account slight changes in the position of the cut surface in relation to the two dimensions in space that do not correspond to the direction of movement of the slaughtered animal half and occurred during the movement of the slaughtered animal half between the first image acquisition device and the second image acquisition device.

In accordance with an embodiment in which the method is designed for image acquisition of slaughtered animal halves that, in relation to a suspended orientation, that is, an essentially vertical orientation, which is furnished with a cut that runs in the horizontal direction and does not completely sever the slaughtered animal half, the halves of each of the slaughtered animals are aligned in such a way that the entry sides of the cuts made in order to produce the cut surface in the two slaughtered animal halves of the respective carcass of the slaughtered animal face each other when the method is used for a plurality of suspended slaughtered animal halves moving through the processing line. Preferably, namely, in particular for the image acquisition for the grading of the rib eye of the sides of beef of slaughtered animals, the suspended slaughtered animal halves moving through the processing line are hereby aligned in such a way that their bone sides face the optical components of the two image acquisition devices. In accordance herewith, the halves of each carcass of a slaughtered animal face each other with their side having one-half of the backbone. Because, in turn, in connection with the grading of the rib eye in the case of beef, the cut usually made between the 12th rib and the 13th rib for this purpose in the slaughtered animal halves is made starting from the backbone in the respective slaughtered animal half, without severing the backbone; this means, at the same time, that, in this case, the entry sides of the cuts made in the halves of a carcass of a slaughtered animal face each other.

In a further development of the previously explained embodiment of the method for image acquisition of the rib eye of sides of beef of slaughtered animals, the bone sides of which face the image acquisition devices, the suspended slaughtered animal halves moving through the processing line are aligned through the application of pressure against their free end, situated below the cut, transversely to the tube track at an inclination to the vertical by means of the already mentioned positioning device. The slaughtered animal halves are hereby inclined toward the vertical in such a way that the bottom cut surface of the cut made in them is inclined toward the optical components of the image acquisition device, whereas the top cut surface is inclined away from said optical components. The aforementioned pressure applied against the bottom free end of the slaughtered animal half (the side of beef of a slaughtered animal), which is suspended at the tube track, can be brought about, for example, simply through the corresponding arrangement of a component of the positioning device. Thus, for example, this can be brought about in that a component of the positioning device protrudes into the track of movement of the slaughtered animal half or of the slaughtered animal halves that is predetermined by the course of the tube track.

The intent and purpose of this measure is the following: As discussed, a cut that runs essentially horizontally in relation to the suspended slaughtered animal half moving through the processing line is made in the side of beef of a slaughtered animal for the grading of the rib eye. As a result of this cut, the slaughtered animal half is not completely severed, but still severed to a large extent. The top part of the slaughtered animal half, in relation to the cut, is consequently still joined to the bottom free end of this slaughtered animal half only by a relatively narrow strip of meat and fat. When the slaughtered animal half is moved along the tube track, therefore, it often occurs that the bottom free end of the slaughtered animal half starts to swing. However, this, in turn, causes the position of the cut surface that is to be evaluated (regardless of whether the bottom cut surface or the top cut surface is being taken for the grading) to change with respect to the specific position determined originally for it by means of the first image acquisition unit and the image processing unit in an ongoing and hereby, under circumstances, also stronger manner. Obviously, however, it should be ensured by means of the positioning device that, when passing the second image acquisition device, the slaughtered animal half and accordingly the cut surface that is to undergo image acquisition for the grading remain nearly fully unchanged with respect to the positional determination—in any case apart from its coordinates relating to the direction of movement through the processing line. Only in this way can it be ensured that, from the image or images obtained by means of the second image acquisition device, exact results for the position and extension of the individual tissue compartments (meat, fat, and bones) along the cut surface are obtained.

Through the alignment of the slaughtered animal half transverse to the tube track and at an inclination toward the vertical, the discussed, undesired swinging movement of the slaughtered animal half, that is, in particular of its bottom free end, is largely prevented. By means of the positioning device, namely, the bottom free end of the slaughtered animal half is moved out of the vertical, but with this bottom free end inherently having, at the same time, the tendency to move once again into the vertical on account of the effect of the force of gravity. Therefore, the bottom free end of the slaughtered animal half falls back on account of the force of gravity more or less against the component of the positioning device that exerts the pressure against this end and accordingly assumes a largely stable position that is inclined toward the vertical.

Under circumstances, the inclined alignment of a respective slaughtered animal half can also be assisted by still further components of the positioning device that exert a light applied force in the same direction against the region of the slaughtered animal half situated above the cut. In this way, the tendency is counteracted, additionally and, under circumstances, even better, that the slaughtered animal half is slightly twisted around its own axis during its movement through the processing line toward the second image acquisition device and accordingly also changes the position of the cut surface in an undesired way.

In accordance with the preceding statements, it is correspondingly provided in a possible embodiment of the method that the bottom cut surface of a cut made in a side of beef of a slaughtered animal for the grading of the rib eye undergoes image acquisition by means of optical components of an acquisition device that are arranged at an angle above the cut and, to this end, the side of beef of a slaughtered animal is aligned at a slight inclination toward the vertical in such a way that its bottom free end is moved away from the optical components of the second image acquisition device, so that the bottom cut surface of the cut made in the slaughtered animal half is inclined toward the optical components of the image acquisition devices, in particular of the second image acquisition device serving for image acquisition of the cut surface.

For the purpose of stabilizing the slaughtered animal halves against swinging movements and against twisting, it would fundamentally also be conceivable to incline the slaughtered animal halves in the opposite direction toward the vertical, this being mentioned here only for completeness, however. In regard to how the inclination of the carcasses of slaughtered animals toward the vertical in accordance with an advantageous implementation of the method and of a system used for this purpose is brought about, however, an alignment in the previously described way, in which the bottom cut surface is more strongly inclined toward the optical components of the image acquisition devices, is to be given priority. In the following, this will briefly be addressed immediately once again.

In an especially preferred embodiment of the method, a vertically arranged conveyor belt is used as a positioning device, which serves for the alignment of the slaughtered animal half with the cut surface that is to undergo image acquisition in each case in accordance with the previously presented considerations, said conveyor belt being brought into contact with the slaughtered animal half that is to be aligned in each case. The conveying direction of this vertically arranged conveyor belt hereby corresponds to the direction of movement of the slaughtered animal halves in the processing line. More detailed statements on this will be made later in connection with the explanation of an insofar advantageous embodiment of the system according to the invention presented below.

At this point, it is merely noted that the position of the aligned slaughtered animal half that is regarded in each case changes during its movement from the first image acquisition device for the 3D measurement to the second image acquisition device owing to the action of the positioning device, namely, with retention of a contact with the conveyor belt, with this movement occurring essentially only in relation to one coordinate of a 3D reference system. Taking into consideration the change of this coordinate and of the other two coordinates, which remain at least nearly unchanged after the 3D measurement, it is possible for the cut surface to undergo image acquisition by the optical means of the second image acquisition device for the meat grading very reliably and with a high degree of reproducibility.

In connection with the use of a vertically arranged conveyor belt as a positioning device, it can be seen why said conveyor belt is arranged in such a way that the slaughtered animal halves are inclined toward the vertical owing to the contact with the conveying surface of the conveyor belt in such a way that, in each case, their bottom cut surface produced by a cut is inclined toward the optical components of the image acquisition devices, that is, faces them more strongly. To this end, namely, the vertical conveyor belt, that is, in particular, the vertically aligned conveying surface thereof, is arranged on the bone side of the slaughtered animal halves that faces the optical components of the image acquisition devices. Accordingly, the conveyor belt is arranged between the optical components in question and the slaughtered animal halves, but with its top edge as already discussed in each case, that is, in relation to each slaughtered animal half moving along the tube track through the processing line, extending below the produced bottom cut surface, so that the cut surface is not covered by the conveyor belt. In contrast, for an oppositely oriented inclination of the slaughtered animal halves, a corresponding conveyor belt would have to be arranged, in relation to the optical components of the image acquisition devices, behind the slaughtered animal halves, that is, on their skin side that faces away from the bone side. Here, however, owing to anatomy, the slaughtered animal halves have a more rounded outer contour, so that, via the resulting relatively small contact surface between the conveyor belt and the skin side of a respective slaughtered animal half, a stabilization of the slaughtered animal half against any undesired twisting would not be uniformly ensured in a reliable manner.

The system according to the invention for image acquisition of a cut surface of a slaughtered animal half that, for creation of the corresponding cut surface, was furnished with a gaping cut and, suspended along a tube track, is fed through a processing line, has, in particular:

- a control device as well as an image processing device, wherein these two devices can also form, as is to be preferred, a common (integral) unit,
- a positioning device for alignment of the suspended slaughtered animal halves in accordance with a predetermined orientation for the image acquisition,
- a first image acquisition device for recording a three-dimensional image for determining in the course of a 3D measurement, which occurs in interaction with the aforementioned image processing device, the position in space of the cut surface that is produced at the slaughtered animal half for the meat grading and, subsequent to this, is to undergo image acquisition once again for the meat grading, means that interact with the aforementioned control device for the purpose of setting a trigger point at the conclusion of the 3D measurement for determining the position in space of the cut surface, a second image acquisition device aligned in accordance with the position determined by the control device for the cut in relation to its optical components, said second image acquisition device being designed for at least one image acquisition, started under trigger control by means of the control device, of at least one two-dimensional image of the cut surface of the slaughtered animal that is to be evaluated by the image processing device for the meat grading.

In accordance with an advantageous embodiment of the system, the optical components of the aforementioned second image acquisition device, which serves for the actual image acquisition of the cut surface for the meat grading, are arranged at an arm of a robot. Preferably, what is hereby involved is an arm of a robot that has six dynamic degrees of freedom. In accordance with an insofar possible further development, it is also possible for the optical components of the first image acquisition device, by use of which the 3D measurement for determining the position of the cut surface is carried out, to be arranged at this arm of a robot. In this case, by means of the optical components of the first image acquisition device, an image for the 3D measurement in regard to the position of the cut surface would be recorded and afterwards the optical components of the second image acquisition device of the slaughtered animal half moving further along in the processing line would be tracked by means of the arm of a robot and aligned in accordance with the specific position for the cut surface.

In accordance with a possible embodiment of the system according to the invention, the first image acquisition device can be a laser scanner. In correspondence with an already explained embodiment of the method, the second image acquisition device is preferably designed both for a two-dimensional image acquisition and for a three-dimensional image acquisition of the cut surface that is to be evaluated. Coming into consideration for the second image acquisition device is hereby, with an eye on the possibility of a three-dimensional image acquisition, for example, the utilization of a 2D camera in conjunction with a light strip for the application of the light section method on the laser projecting onto the cut surface.

For three-dimensional image recordings, moreover, it is possible to use, either in one of the image acquisition devices or, optionally, also in both of the image acquisition devices, a stereo camera. By means of such a stereo camera, it is possible, for example, to acquire both two-dimensional images and three-dimensional images by using the second image acquisition device depending on the mode of operation. For the three-dimensional image acquisition, however, it is also possible to use a special 3D camera system, such as, in particular, a TOF camera (TOF=time of flight).

What is involved in the case of the already discussed positioning device for the alignment of a respective slaughtered animal half furnished with the cut surface, in accordance with a preferred embodiment of the system according to the invention, is a vertically arranged conveyor belt. The conveying direction of this conveyor belt hereby corresponds to the direction of movement of the slaughtered animal halves through the processing line, whereby preferably, in addition, the conveying speed of this conveyor belt is synchronized with the speed of movement of the slaughtered animal half or of the slaughtered animal halves in the processing line. In addition, the conveyor belt is arranged in relation to the tube track of the processing line in such a way that the slaughtered animal halves that are brought into contact with it are inclined slightly toward the vertical direction and, namely, in such a way that, in each case, the bottom cut surfaces of the cuts made in them are inclined toward the optical components of the image acquisition devices. The surface of the conveyor belt brought into contact with the slaughtered animal halves can hereby even be arranged jointly in a vertical plane with the tube track, that is, with the point of suspension of the suspended slaughtered animal halves on the tube track. The upper edge of this conveyor belt hereby extends below the essentially horizontally extending cut that is made in each of the slaughtered animal halves. Beyond this, the positioning device can additionally comprise a second perpendicularly situated conveyor belt, the bottom edge of which, in each case, extends above the cut made in a respective slaughtered animal half moving vertically through the processing line and the conveying direction of which is likewise identical to the direction of movement of the slaughtered animal half in the processing line. In each case, the conveying speed of such a further conveyor belt corresponds to the conveying speed of the first-mentioned conveyor belt.

In connection with the utilization of at least one vertically aligned conveyor belt as a positioning device, it is provided in a possible embodiment of the system that the conveyor belt is equipped with an incremental measuring wheel encoder. By means of the measuring wheel encoder, a trigger point is hereby established and it is also established, by the control device, when a trigger condition deposited in the control device is met. This occurs in that, in the control device of the system at the point in time when the determination of the position of the cut surface to be evaluated on a respective slaughtered animal half has concluded, a counter assigned to the measuring wheel of the aforementioned encoder is set to the value "zero" in terms of setting a trigger point. Subsequently, this counter is incremented in the course of the further movement of the conveyor belt with each therewith accompanying revolution of the measuring wheel of the encoder. In each case, following the incrementation, the aforementioned counter is compared with a value deposited likewise in the control device as a trigger condition, said value coding those distances that the conveyor belt and accordingly the slaughtered animal half brought into contact with it must traverse after the trigger point has been set until the slaughtered animal half has moved so far along the tube track starting from the first image acquisition device in the direction of the second image acquisition device that the cut surface that is to be evaluated can undergo certain image acquisition by means of the latter.

At this point in the discussion, it is further mentioned, in particular also in regard to the method, that the trigger point and the trigger condition for the starting of the actual image acquisition of the cut surface employed for the meat grading by means of the second image acquisition device can also have a temporal relation. The distance-related triggering by means of the measuring wheel encoder, however, has the advantage that, even in the event of a possible interruption, such as, for example, an interruption due to a malfunction, of the sequence of movement in the processing line, it is ensured on account of the therewith entailed interruption of the conveying movement of the conveyor belt that the image acquisition of the cut surface that is to be evaluated occurs exactly when the respective slaughtered animal half is situated in the correct position for said image acquisition in front of the optical components of the second image acquisition device.

Presented below on the basis of drawings is an exemplary embodiment of the invention. The drawings show in detail:

DETAILED DESCRIPTION OF THE DRAWINGS

Figure 1:
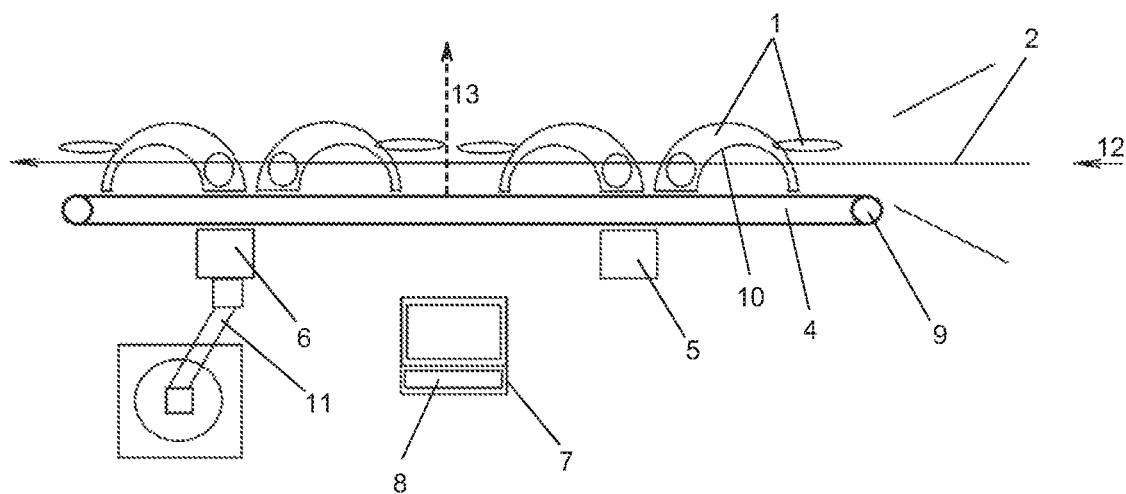
FIG. 1: a plan view of a possible embodiment of the system in a schematic illustration.

FIG. 1 shows a possible embodiment of the system according to the invention in a strongly schematic illustration. Shown in the drawing are key components of the system in assignment to a cutout of the tube track 2 of a meat processing line in plan view, in which, by way of illustration, also four slaughtered animal halves 1, that is, two sides of beef of the carcasses of slaughtered animals, which are suspended at the aforementioned tube track and which pass the system during their movement through the processing line, are illustrated.

In accordance herewith, the system essentially comprises a positioning device 4, a first image acquisition device 5, and a second image acquisition device 6 as well as an image processing device 8 and a control device 7, with the two last-mentioned devices forming a common unit in the example shown. In accordance with the example, the positioning device 4 is a vertically arranged conveyor belt, the conveying direction and conveying speed of which correspond to the direction of movement 12 and the speed of movement with which the slaughtered animal halves 1 are moved through the processing line. The aforementioned individual devices and units of the system can be connected in a hard-wired manner or in a wireless manner, for example, in order to exchange data and control commands and, accordingly, they can be brought into an operative connection.

By means of the positioning device 4, that is, by means of the conveyor belt that is brought into contact with the slaughtered animal halves 1 suspended at the tube track, the slaughtered animal halves 1 are aligned in such a way that their respective bone side 10 faces the optical components, which are not individually shown, in the image acquisition devices, namely, the first image acquisition device 5 and the second image acquisition device 6. The vertically installed conveyor belt of the positioning device 4 is hereby arranged together with the tube track 2 nearly in a common vertical plane. It is hereby achieved that the slaughtered animal halves 1 suspended at the tube track 2 are aligned at an inclination toward the vertical by the positioning device 4 (the conveyor belt) slightly in the direction of the arrow 13. The free bottom end of the slaughtered animal halves 1 suspended at the tube track 2 is hereby forced by the conveyor belt of the positioning device 4 more or less away from the image acquisition devices 5, 6. In this way, in each case, the bottom cut surface 3 produced by making a cut in the slaughtered animal halves (not seen here, but shown in FIG. 2), is inclined toward the optical components in the image acquisition devices 5, 6.

By means of the first image acquisition device 5, in interaction with the image processing device 8, through a 3D measurement, the respective position of the cut made in each of the slaughtered animal halves 1 (not seen here), that is, the position of the cut made through said slaughtered animal halves, is determined in space for the cut surface 3 taken for the meat grading. Once the position of this cut surface 3 is determined for a respective slaughtered animal half 1, a trigger point is set in the control device 7 in that a counter, which is assigned to a measuring wheel encoder 9 provided at the perpendicularly arranged conveyor belt of the positioning device 4, is set to the value "zero." In the course of the further movement of the conveyor belt and, accordingly, the further movement of the related slaughtered animal half 1 that is brought into contact with the conveyor belt of the positioning device 4 along the tube track 2, the aforementioned counter contained in the control device 7 is increased, that is, incremented with each revolution of the measuring wheel of the measuring wheel encoder 9. Furthermore, the counter value obtained in each case by incrementation is continuously compared with a value that is deposited as a trigger condition in the control unit, said value being an equivalent for the path distance, that is, being coded for the distance, that the conveyor belt of the positioning device 4 and accordingly the slaughtered animal half brought into contact with the conveyor belt have to traverse after the trigger point has been set (after the counter assigned to the measuring wheel has been zeroed) until the cut surface 3 made in the slaughtered animal half 1 for the meat grading can undergo reliable image acquisition by means of the second image acquisition device 6.

During the further movement of the conveyor belt and the slaughtered animal half brought into contact with it, moreover, optical components (not shown here) of the second image acquisition device 6 are positioned in space in accordance with the specific position of the cut surface that is to undergo image acquisition for the meat grading by use of the first image acquisition device 5, with the required positioning of these optical components, that is, the change in position thereof that possibly occurs in relation to the coordinate of the direction of movement 12 in the processing line, being taken into consideration in the comparison value representing the trigger for the counter of the measuring wheel encoder 9.

When the trigger condition is met, that is, after the conveyor belt of the positioning device 4 and, together with it, the slaughtered animal half 1 that is to be evaluated in each case have traversed a predetermined, typically short distance within the processing line, the image acquisition of the cut surface 3 produced in this slaughtered animal half 1 by means of the second image acquisition device 6 is triggered. The image or images hereby recorded by the second image acquisition device 6 are analyzed by the image processing device 8 and a software running on it and, as a result of this, statements in regard to meat quality, in regard to meat yield, or in regard to both are derived from this analysis. In this way, for example, statements about the meat quality and the meat yield are made by way of the image acquisition of a cut surface 3 that was produced beforehand by making a cut between the 12th rib and the 13th rib in a side of beef of a slaughtered animal and includes the rib eye.

Figure 2:
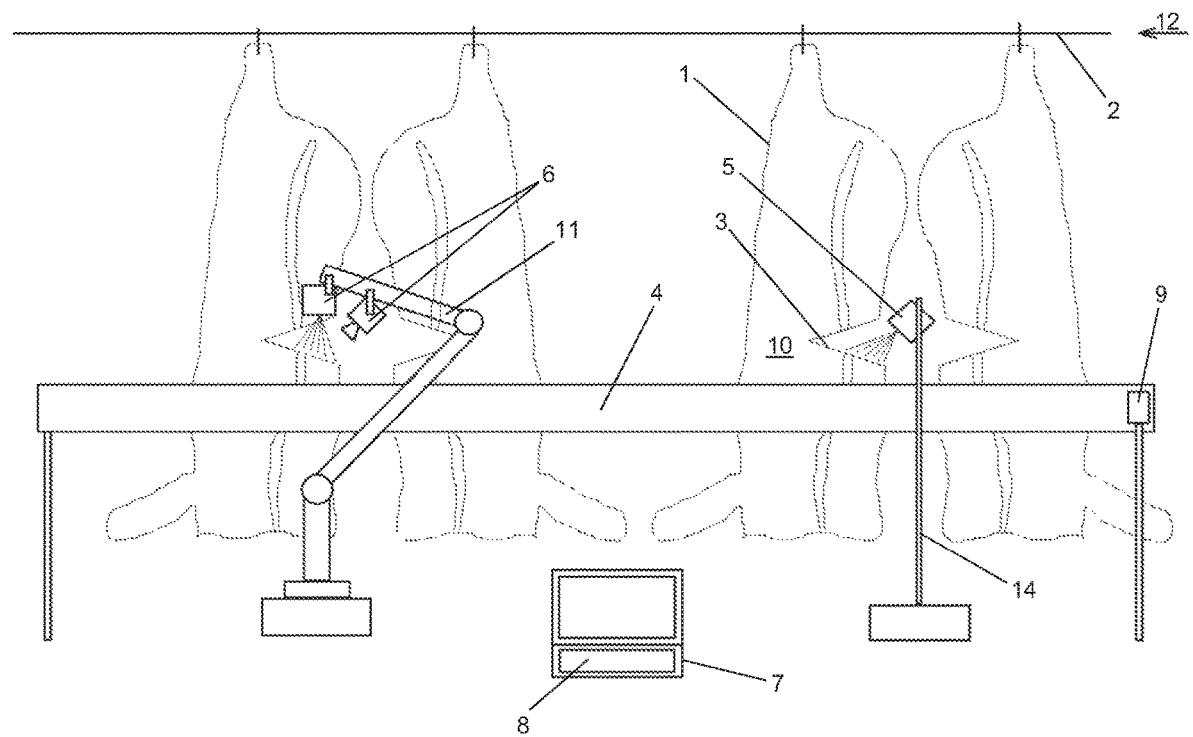
FIG. 2: the embodiment in accordance with FIG. 1 in a side view.

In FIG. 2, the embodiment of the system in accordance with FIG. 1 is shown once again in a somewhat detailed side view, but also in a still strongly schematic illustration. In this illustration, in particular, also the outer edges of each of the cut surfaces 3 produced by making a cut in the slaughtered animal halves 1 can be seen. By means of the first image acquisition device 5, a laser scan of a respective slaughtered animal half 1 is carried out, by way of which, in interaction with the image processing device 8, the position of the cut surface 3 produced at the slaughtered animal half 1 and containing the rib eye is calculated in three-dimensional space. In accordance with the outcome of this calculation, the optical components of the second image acquisition device 6 are aligned for the subsequent image acquisition of at least one two-dimensional cut surface 3 on which the meat grading is based. The optical components of the second image acquisition device 6 are, for example, a 2D camera and a laser.

After the trigger-controlled start of the image acquisition of the cut surface 3 by the second image acquisition device 6, a two-dimensional image thereof is initially acquired by means of the 2D camera. Immediately following this, a three-dimensional image acquisition of the cut surface 3 occurs. To this end, by means of the laser, parallel lines are projected on the cut surface, by use of which, in interaction with the image processing device 8, a three-dimensional image of the cut surface 3 is obtained from the images acquired with the 2D camera of the second image acquisition device 6. Through analysis of the color variation in the two-dimensional image or images acquired from the cut surface by means of the image processing device 8, it is then possible to make statements in regard to marbling of the rib eye contained in the cut surface 3, in regard to the fat/meat ratio, and in regard to the total meat yield for the rib eye in question.

The 3D image or images of the cut surface 3 obtained subsequently to the two-dimensional acquisition of the cut surface 3 by means of the laser-using light section method is or are utilized for possibly required corrections of the results of the two-dimensional acquisition of the cut surface 3, with corrections of this kind being possibly required on account of possible changes in the position of the cut surface 3 during the movement of the slaughtered animal half 1 between the first image acquisition device 5 and the second image acquisition device 6.

In the exemplary embodiment shown in FIGS. 1 and 2, the first image acquisition device 5 and the second image acquisition device 6 are arranged at stations that are separated from one another at the side of the tube track 2. As can be seen in FIG. 2, in spite of the schematic illustration, the optical components of the second image acquisition device 6 are hereby arranged at an arm of a robot 11 that serves for the alignment thereof. The robot arm 11 has six dynamic degrees of freedom and is moved, under the control of the control device 7, in accordance with the course of the 3D measurement at the work station with the first image acquisition device 5 in regard to the data for the position of the cut surface 3 at a respective slaughtered animal half 1, in order to align the optical components of the second image acquisition device 6. The optical components of the first image acquisition device 5—for example, a laser scanner—are arranged in a fixed position at a tripod in the exemplary embodiment shown. At this tripod 14, in the course of setting up the system for the purpose of positional determination of the cut surfaces 3 of the slaughtered animal halves 1 that pass them, said optical components are aligned uniquely by means of the described principle of grayscale values in regard to a locally minimum distance of the cut surfaces 3 serving as a reference line for this purpose.

Fundamentally, it is also conceivable to arrange the optical components of the first image acquisition device 5 and of the second image acquisition device 6 jointly at an arm of a robot 11 and, after the spatial position of the cut surface 3 within the slaughtered animal half 1 has been established, to hereby track the robot arm 11 along the further moving carcasses of slaughtered animals 1 for the purpose of the actual image acquisition of the cut surface 3 by means of the optical components of the second image acquisition device 6.

The invention claimed is:

1. A method for image acquisition, in accordance with which, at a suspended slaughtered animal half moving along a tube track through a processing line, for a meat grading by way of an electronic image processing device, at least one subregion of a cut surface produced previously at the slaughtered animal half undergoes image acquisition, comprising the steps:
   a. alignment of the suspended slaughtered animal half in accordance with a predetermined orientation and retention of this orientation by means of a positioning device, which is designed as a part of the processing line, until the conclusion of the image acquisition of the cut surface or the subregion thereof;
   b. execution of a 3D measurement and, in association therewith, setting of a trigger point in a control device, wherein, for the slaughtered animal half, the position in space of the cut surface that is to undergo image acquisition for the meat grading is determined by the image processing device from a three-dimensional image recorded by a first image acquisition device;
   c. alignment of the optical components of a second image acquisition device, which is designed for the image acquisition of the cut surface or of the subregion of the cut surface, in accordance with the position in space determined for the cut surface that is to undergo image acquisition;
   d. trigger-initiated execution of at least one two-dimensional image acquisition of the cut surface or of the subregion of the cut surface by means of the second image acquisition device, the optical components of which are aligned beforehand, when a trigger condition coupled to the trigger point set in accordance with method step b) is met, as identified by the mentioned control device.

2. A method for image acquisition, according to which, for a grading of the rib eye of a side of beef of a slaughtered animal by means of an electronic image processing device, a cut surface, namely, the top cut surface or the bottom cut surface of a cut made beforehand between the 12th rib and the 13th rib in the slaughtered animal half, undergoes image acquisition, with said cut not completely severing the slaughtered animal half and running essentially horizontally in regard to the suspended slaughtered animal half at a tube track moving through a processing line, comprising the steps:
   a. alignment of the suspended slaughtered animal half, furnished with the gaping cut, in accordance with a predetermined orientation and retention of this orientation by means of a positioning device formed as a part of the processing line until the image acquisition of the cut surface has concluded;
   b. execution of a 3D measurement and, in association therewith, setting of a trigger point in a control device, wherein, for the slaughtered animal half, the position of the cut surface that contains the rib eye and is to undergo image acquisition for the meat grading is determined by the image processing device from a three-dimensional image recorded by a first image acquisition device;
   c. alignment of the optical components of a second image acquisition device designed for the image acquisition of the cut surface in accordance with the position in space determined for the cut surface that is to undergo image acquisition;

d. trigger-initiated execution of at least one two-dimensional image acquisition of the cut surface by means of the second image acquisition device, the optical components of which are aligned beforehand, when a trigger condition coupled to the trigger point set in accordance with method step b) is met, as identified by the mentioned control device.

3. The method according to claim 1 or 2, wherein, in each case, in the method step d), trigger-started by means of the second image acquisition device, a two-dimensional image acquisition of the cut surface first occurs and, immediately afterwards, a three-dimensional image acquisition of the cut surface occurs.

4. The method according to claim 2 in continuous application for a plurality of slaughtered animal halves that are suspended next to one another and move through the processing line, wherein the halves of each carcass of a slaughtered animal are aligned in such a way that the entry sides of the cuts made for producing the cut surface in these two slaughtered animal halves of the respective carcass of a slaughtered animal face each other.

5. The method according to claim 2 in continuous application for a plurality of slaughtered animal halves that are suspended next to one another and move through the processing line, wherein the halves of each carcass of a slaughtered animal are aligned in such a way that their bone sides face the optical components in the image acquisition devices and in that the halves of each carcass of a slaughtered animal face each other at the side of the backbone.

6. The method according to claim 5, wherein an applied force is exerted by the positioning device against the free end of the slaughtered animal half situated below the cut and the slaughtered animal half is aligned at an inclination toward the vertical transversely to the tube track in such a way that the bottom cut surface of the slaughtered animal half is inclined toward the optical components of the two image acquisition devices, whereas the top cut surface is aligned at an inclination away from the optical components of the image acquisition devices.

7. The method according to claim 1 or 2, wherein, as a positioning device, at least one vertically arranged conveyor belt, which is brought into contact with the slaughtered animal to be aligned in each case, is used, the conveying direction of which corresponds to the direction of movement of the slaughtered animal half in the processing line and which is equipped with an incremental measuring wheel encoder, wherein, for setting a trigger point with the conclusion of the positional determination for the cut surface that is to be evaluated, a counter counting the revolutions of the measuring wheel of said encoder is set to zero and wherein the trigger condition for starting the subsequent image acquisition of the cut surface that is to be evaluated by means of the second image acquisition device involves a path distance that is to be traversed by the vertically arranged conveyor belt after setting of the trigger point and is coded by a number of revolutions of the measuring wheel of the encoder deposited in the control device.

8. A system for image acquisition of a cut surface, which has, as a bottom cut surface or as a top cut surface of a slaughtered animal suspended along a tube track and moving through a processing line, a horizontally running cut, which does not completely sever the slaughtered animal half, for the purpose of the meat grading, wherein the system has a control device as well as an image processing device, a positioning device for alignment of the suspended slaughtered animal half in accordance with a predetermined orientation for image acquisition of the cut surface, a first image acquisition device for recording a three-dimensional image for subsequently determining, in interaction with the image processing device in the course of a 3D measurement, the position in space of the cut surface that is to undergo image acquisition for the meat grading, with means interacting with the control device for setting a trigger point at the conclusion of the 3D measurement for determining the position of the cut surface, a second image acquisition device, which is aligned by the control device in regard to the optical components thereof in accordance with the position determined for the cut surface, for an acquisition, started by trigger control by means of the control device, of at least one image of the cut surface of the slaughtered animal half that is to be analyzed by the image processing device for the meat grading.

9. The system according to claim 8, wherein the positioning device is arranged for alignment and guiding of the suspended slaughtered animal half by at least one vertically arranged conveyor belt that is brought into contact with the slaughtered animal, the conveying direction of which is identical to the direction of movement of the slaughtered animal half in the processing line and the top edge of which extends below the bottom cut surface produced by the cut at the slaughtered animal half.

10. The system according to claim 9, further characterized in that the conveying speed of the at least one vertically arranged conveyor belt forming the positioning device corresponds to the speed at which the slaughtered animal half is moved along the tube track through the processing line.

11. The system according to claim 9, wherein the at least one vertically arranged conveyor belt forming the positioning device is equipped with an incremental measuring wheel encoder, to which is assigned a counter in the control device interacting with it, said counter being set to zero for setting a trigger point, and wherein the aforementioned counter is incremented with each revolution of the measuring wheel of the measuring wheel encoder and is compared by the control unit with a value deposited in the control unit as a trigger condition, which codes a path distance traversed by the at least vertically arranged conveyor belt since the setting of the trigger point.

12. The system according to claim 9, wherein the at least one vertical conveyor belt of the positioning device is arranged in a common vertical plane with the tube track at which the slaughtered animal half is moved through the processing line.

13. The system according to claim 9, wherein the positioning device comprises a second vertically arranged conveyor belt that is brought into contact with the slaughtered animal half, the bottom edge of which extends above the top cut surface produced by the cut at the slaughtered animal half and the conveying speed of which is equal to the conveying speed of the other vertically arranged conveyor belt of the positioning device.

14. The system according to claim 13, wherein the two conveying belts of the positioning device have a common drive.

15. The system according to claim 8, wherein the optical components of the second image acquisition device serving for the actual acquisition of the cut surface produced at a slaughtered animal half for the purpose of the meat grading are arranged at an arm of a robot.

16. The system according to claim 15 wherein the optical components of the second image acquisition device are arranged jointly with the optical components of the first image acquisition device at the arm of a robot.

17. The system according to claim 8, wherein the first image acquisition device is a laser scanner.

18. The system according to claim 8, wherein the second image acquisition device is formed for two-dimensional and three-dimensional image acquisition of the cut surface that is to undergo image acquisition for the meat grading.

19. The system according to claim 18, wherein the second image acquisition device comprises a 2D camera and a laser that projects a plurality of parallel light strips for application of the light section method onto each cut surface that is to undergo image acquisition.

20. The system according to claim 8, wherein at least one of the two image acquisition devices comprises a stereo camera.

21. The system according to claim 8, wherein at least one of the two image acquisition devices comprises a TOF camera, that is, a camera operating according to the "time of flight" principle.

* * * * *